(12) United States Patent
Osborne

(10) Patent No.: US 6,948,299 B2
(45) Date of Patent: Sep. 27, 2005

(54) HYBRID POWER EQUIPMENT

(75) Inventor: Christopher M. Osborne, Efland, NC (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 10/720,559

(22) Filed: Nov. 24, 2003

(65) Prior Publication Data

US 2004/0134175 A1 Jul. 15, 2004

Related U.S. Application Data

(60) Provisional application No. 60/428,444, filed on Nov. 22, 2002.

(51) Int. Cl.$^7$ .............................................. A01D 34/64
(52) U.S. Cl. ...................................................... 56/10.8
(58) Field of Search ............................. 56/6, 7, 10.2 A, 56/10.2 R, 10.2 D, 10.8, 10.6, 2, DIG. 7; 172/2–11; 180/167, 165, 900

(56) References Cited

U.S. PATENT DOCUMENTS

| | | | |
|---|---|---|---|
| 4,320,822 A | | 3/1982 | Meldahl et al. |
| 4,559,768 A | | 12/1985 | Dunn |
| 4,870,811 A | | 10/1989 | Steele |
| 4,964,265 A | * | 10/1990 | Young ......................... 56/10.8 |
| 5,204,814 A | | 4/1993 | Noonan et al. |
| 5,563,774 A | | 10/1996 | Welsch |
| 5,794,422 A | | 8/1998 | Reimers et al. |
| 5,911,670 A | * | 6/1999 | Angott et al. ............ 56/10.2 A |
| 6,082,084 A | | 7/2000 | Reimers et al. |
| 6,321,515 B1 | | 11/2001 | Colens |
| 6,359,344 B1 | | 3/2002 | Klein et al. |
| 6,449,934 B1 | | 9/2002 | Reimers et al. |
| 6,591,593 B1 | | 7/2003 | Brandon et al. |
| 6,604,348 B2 | | 8/2003 | Hunt |
| 6,644,004 B2 | | 11/2003 | Reimers et al. |
| 6,717,281 B1 | | 4/2004 | Brandon et al. |
| 6,734,647 B2 | | 5/2004 | Wakitani et al. |
| 2002/0104300 A1 | | 8/2002 | Hunt |
| 2004/0135373 A1 | | 7/2004 | Osborne |

FOREIGN PATENT DOCUMENTS

| | | |
|---|---|---|
| DE | 10027531 | 1/2001 |
| EP | 1128063 | 8/2001 |
| WO | WO 9728681 | 8/1997 |

OTHER PUBLICATIONS

PCT International Search Report PCT/IB 03/06497 Nov. 24, 2003.
Diesel Progress North American Edition, "A Generator That Cuts Grass", p. 63, Jan. 2002; Waukesha, Wisconsin, U.S.A.

* cited by examiner

Primary Examiner—Robert E Pezzuto
(74) Attorney, Agent, or Firm—Dinsmore & Shohl LLP

(57) ABSTRACT

A power equipment apparatus includes an internal combustion engine and a generator operatively coupled to the engine, wherein the generator is configured to generate electrical power. A driven element such as a wheel is configured to be driven by an actuator, wherein the actuator is configured to receive electrical power from the generator.

22 Claims, 5 Drawing Sheets

HYBRID POWER EQUIPMENT

RELATED APPLICATION

The present application claims priority of U.S. Provisional Application Ser. No. 60/428,444 filed Nov. 22, 2002 and hereby incorporates the same Provisional Application by reference.

TECHNICAL FIELD

The present invention relates to hybrid power equipment having an electrical power source and at least one driven element. The driven element such as a wheel or track is operably coupled to an actuator, wherein the actuator is powered by the electrical power source.

BACKGROUND OF THE INVENTION

Many varieties of power equipment are available for residential, commercial and industrial use. Examples of such power equipment include but are not limited to mowers, lawn tractors, snow blowers, snowmobiles, cable-laying machines, trimmers, tillers, ditch diggers and chippers/shredders. Such varieties of power equipment can be equipped with an internal combustion engine as a primary source of power to facilitate operation of the power equipment. Because power equipment can be quite heavy, driven elements such as wheels, belts or tracks are often provided to better facilitate movement of the power equipment by an operator.

For example, perhaps the most common variety of power equipment having an internal combustion engine and driven elements is a lawn mower. Mowers are available in many sizes and configurations, including but not limited to riding mowers, lawn tractors, walk-behind mowers, and zero-turn radius (ZTR) type mowers. Many such mowers include a mechanical connection between driven elements (e.g., wheels) and the rotating drive shaft of an internal combustion engine. This mechanical connection might typically include pulleys, gears, transmissions, gearboxes, belts, tapes, chains, and/or hydraulic motors, for example. Through such a mechanical connection, one or more of a mower's wheels can be rotated in order to propel the mower along the ground (e.g., causing the mower to be "self-propelled").

Conventional systems for propelling driven elements are typically complicated, bulky, heavy, expensive, unreliable and often provide an operator with limited variability of control, thereby significantly limiting the effective maneuverability of the mower in use. Accordingly, there is a need for smaller, more effective, lighter weight, more efficient, and more reliable methods and apparatuses for causing propulsion of one or more driven elements associated with power equipment.

SUMMARY OF THE INVENTION

Accordingly, it is an aspect of the present invention to provide smaller, more effective, lighter weight, more efficient and more reliable methods and apparatuses for causing propulsion of one or more driven elements associated with power equipment. To achieve the foregoing and other aspects, and in accordance with the purposes of the present invention defined herein, hybrid power equipment is disclosed.

In one embodiment of the present invention, a power equipment apparatus comprises an internal combustion engine and a generator operatively coupled to the engine. A driven element is configured to be operatively coupled to an actuator, wherein the actuator is configured to receive electrical power from the generator.

In another embodiment of the present invention, a walk-behind lawnmower comprises an internal combustion engine and a generator operatively coupled to the engine, wherein the generator is at least partially integral with the engine and is configured to generate electrical power. A wheel is configured to be driven by an electric motor, wherein the electric motor is configured to receive electrical power from the generator.

In yet another embodiment of the present invention, a mower comprises an internal combustion engine and a generator operatively coupled to the engine. A first wheel is operatively coupled to a first electric motor and a second wheel is operatively coupled to a second electric motor. A motion controller is configured to receive electrical power from the generator and to selectively provide the electrical power to the first and second electric motors in accordance with signals from an operator interface.

In still another embodiment of the present invention, a walk-behind lawnmower comprises a handle that is fastened to a deck, wherein the handle supports a drive lever. A plurality of wheels is also associated with the deck, and at least one of the wheels is operatively coupled to a single electric motor that is configured to rotate the coupled wheel(s). An internal combustion engine is associated with the deck and has a drive shaft to which a mowing blade is mechanically coupled. A generator is operatively coupled to the engine, wherein the generator is at least partially integral with the engine and is configured to generate electrical power. A motion controller is configured to receive electrical power from the generator and to selectively facilitate provision of this electrical power to the electric motor in response to engagement by an operator of the drive lever.

The present invention is advantageous for providing smaller, more effective, lighter weight, more efficient and more reliable methods and apparatuses for causing propulsion of one or more driven elements associated with power equipment. Additional aspects, advantages, and novel features of the invention will be set forth in the art upon examination of the following or may be learned with practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
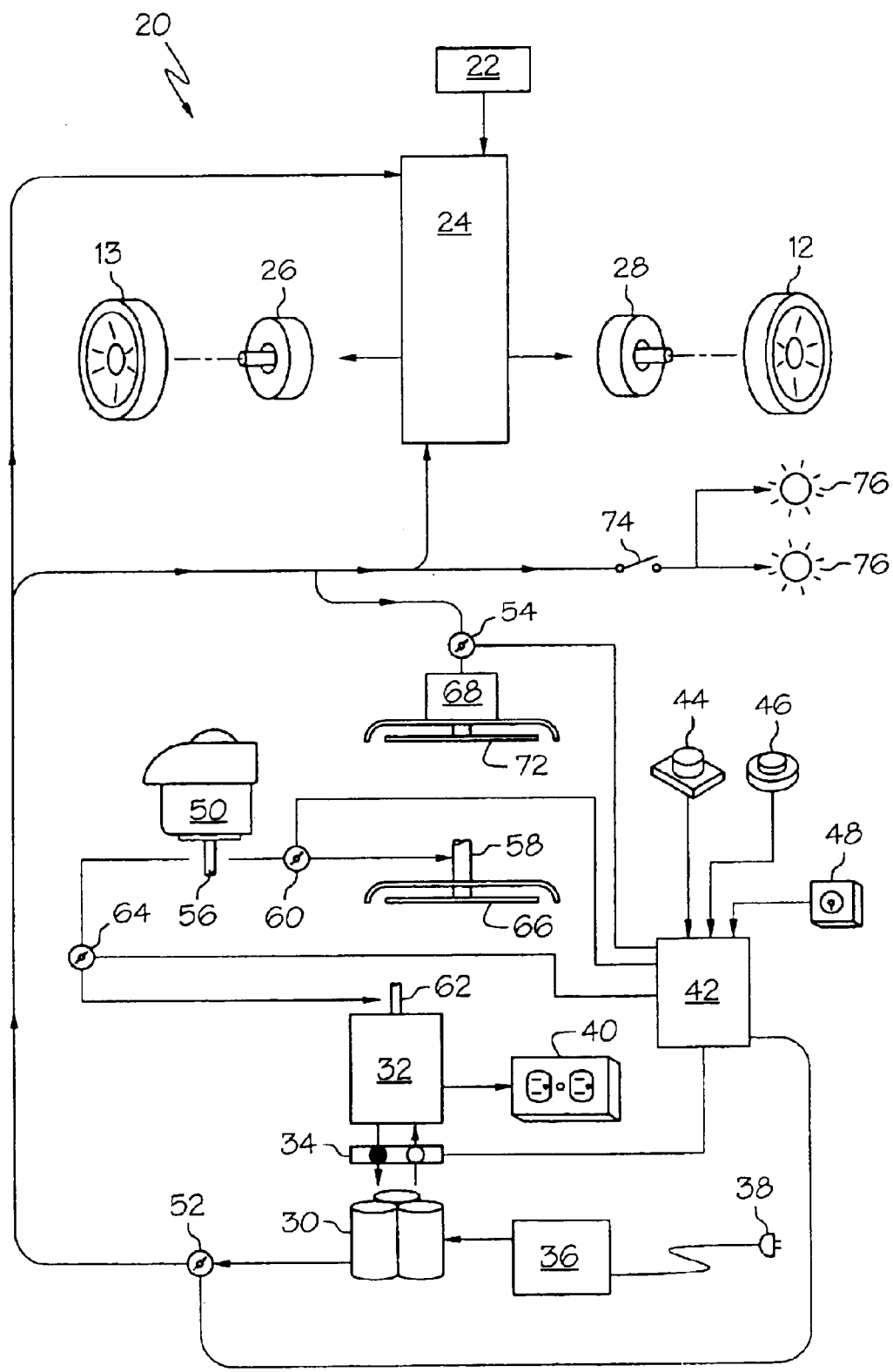
FIG. 1 is a partial block diagram schematically depicting a hybrid propulsion system in accordance with one exemplary embodiment of the present invention.

The present invention and its operation is hereinafter described in detail in connection with the views and examples of FIGS. 1–5, wherein like numbers indicate the same or corresponding elements throughout the views. FIG. 1 depicts an exemplary hybrid propulsion system 20 in accordance with one embodiment of the present invention, and is suitable for association with, for example, a mower of one of the types depicted in FIGS. 2–5. Hybrid propulsion system 20 can comprise an internal combustion engine 50 having a drive shaft 56. Engine 50 can be configured to convert various fuels into mechanical and/or electrical energy in various ways. In one exemplary embodiment of the present invention, engine 50 can be configured to consume gasoline. However, in other exemplary embodiments, engine 50 can consume diesel fuel, liquid propane, fuel oil, natural gas, alcohol, kerosene, hydrogen, and/or other suitable fuels.

Engine 50 can be configured to provide mechanical power (e.g., from engine shaft 56, for example) to one or more power apparatus elements such as, for example, a mowing blade. In one embodiment, such a mowing blade can be mechanically supported or might otherwise be operatively coupled to engine shaft 56, as is common with regard to certain walk-behind mowers, such as that depicted in FIG. 2. An electrical or mechanical clutch, such as a hydraulic clutch, (not shown) can interface engine shaft 56 with a supported mowing blade and can be configured to selectively disengage the supported blade from engine shaft 56. After disengagement of such a clutch, a supported blade can cease rotation even though engine shaft 56 remains rotating.

In other embodiments of mowers (e.g., typically involving larger mowers), engine shaft 56 can be configured to provide power to one or more remote mowing blades. For example, as depicted in FIG. 1, a remote mowing blade 66 can be supported by a blade spindle 58 remotely disposed from engine 50. Blade spindle 58 might be coupled to engine shaft 56 with a belt, tape, chain, transmission, drive shaft, or another suitable power transmission device. A clutch 60 or idler pulley can interface engine shaft 56 with blade spindle 58 in order that blade 66 can be effectively disengaged and selectively stopped from operating even though engine shaft 56 might continue rotating.

Engine 50 might also be configured to provide mechanical power to one or more generators. In the embodiment depicted in FIG. 1, for example, engine 50 can be coupled to a separate generator 32. More specifically, engine shaft 56 can be coupled to a rotor 62 of generator 32 with a belt, chain, drive shaft, tape, or other power transmission device. A clutch 64 might be provided to selectively interface engine shaft 56 with generator rotor 62 such that engine shaft 56 can selectively rotate with or without causing generator rotor 62 to rotate.

In an alternate embodiment, however, a generator can be provided at least partially integrally with an engine. It is to be understood that for such integral applications, an engine/generator can include any combination of engine and generator components that conserves size and/or weight by eliminating the need for certain duplicative mechanical structures that would otherwise be necessary if an engine and generator having similar power production capabilities were provided separately and coupled together. For example, in the exemplary embodiment depicted in FIG. 2, a generator 132 is depicted as being integral with an engine 150. In this example, a fan 186 and a rotor 162 can together fulfill the function normally served by the flywheel of certain conventional internal combustion engines. When assembled, a cover 183 substantially conceals fan 186 and rotor 162 from view and contact by an operator. The combination of rotor 162 with a coil assembly 180 forms generator 132 (e.g., the coil assembly 180 serves as a stator) integrally with engine 150. More specifically, in this example rotor 162 might be configured to incorporate permanent magnets (e.g., 182) or other magnetic flux-inducing elements. Coil assembly 180 (e.g., including a plurality of windings of electrical wire) can be disposed adjacent to and in a fixed position (e.g., against engine block 151) relative to rotor 162. In operation, coil assembly 180 can experience the magnetic field developed by the magnets (e.g., 182) and can convert this magnetic field into electrical power for transmission through a cable or other transmission link 181 to other components of the hybrid propulsion system. By integrating generator 132 with engine 150 in this manner, a compact and light-weight engine/generator arrangement can be achieved at a significantly reduced cost as compared to the combination of separate engine and generator components or assemblies. In one embodiment, engine 150 can have a similar engine/generator structure to that present in the relatively conventional model EU1000i portable generator (currently manufactured and sold commercially by Honda Power Equipment Group of Alpharetta, Ga.). Power equipment incorporating an integral engine/generator arrangement can generally require fewer components (or at least fewer redundancies) and might resultantly be more compact and/or lighter than embodiments incorporating a separate engine and generator.

In either embodiment, the engine might also be configured to provide mechanical power to one or more hydraulic pumps, air compressors or other mechanical power take-off (PTO) devices. Such devices can be mechanically coupled to an engine shaft (e.g., 56) with belts, chains, tapes, pulleys, gears, or other power transmission devices. Also, such devices might be selectively engaged/disengaged from the engine shaft by one or more clutches, idler pulleys, or other electrical or mechanical coupling arrangements.

Turning back to FIG. 1, engine 50 can be configured to be pull-started and/or electrically started by an operator. In an embodiment wherein engine 50 is configured to be electrically started, a separate starter motor (not shown) can be selectively coupled to engine shaft 56 and a battery 30 and can be activated upon selection of one or more switches by an operator (e.g., ignition switch 48). However, in the embodiment depicted by FIG. 1, generator 32 can also be configured to selectively serve as an electric starter for engine 50. More specifically, when generator 32 is configured for such dual operation (e.g., starter/generator), an interface device can couple generator 32 with a battery 30. This interface device 34 can involve one or more contactors having a plurality of positions. In a first position, interface device 34 can enable power to selectively pass from battery 30 into generator 32, thereby enabling rotor 62 to start engine 50 by rotating engine shaft 56. In a second position, interface device 34 can allow electrical power to flow from generator 32 into battery 30 in order to charge battery 30, for example. In this second position, such as during operation of engine 50, interface device 34 might include a diode or another voltage regulating device to ensure that battery 30 is charged in an appropriate matter.

Interface device 34 might also include a third position that disconnects generator 32 from battery 30. This third position could be automatically activated when, for example, the voltage of battery 30 exceeds an acceptable level. Interface device 34 can be either manually controlled by an operator and/or can be controlled automatically by a controller 42 in accordance with instructions provided to controller 42 by an operator and/or a program. Battery 30 might comprise a lead-acid, nickel-cadmium or other type of battery configured to provide a nominal voltage of about 6 Volts Direct Current (VDC), 12 VDC or 24 VDC, for example. In one embodiment, battery 30 might be supported either by the deck or by the handle of an associated mower. In another embodiment, a hybrid propulsion system might not comprise a battery in order that an associated power equipment apparatus can have a lighter weight.

The generator might also be optionally configured to also provide power to an associated receptacle 40. In one exemplary embodiment for use within the United States, receptacle 40 can be configured to provide between about 110 and about 130 Volts Alternating Current (VAC), and more particularly can be configured to provide about 120 VAC. However, receptacle 40 could be configured to provide any voltage that is usable by consumers. In an exemplary embodiment, an inverter or other power conditioning device (not shown) might interface the generator with receptacle 40. For example, an inverter could continuously ensure that the electrical power dispensed to receptacle 40 maintains a constant voltage and frequency (e.g., such as through pulse width modulation). Through receptacle 40, an operator can accordingly conveniently access electrical power for power tools, lighting, radios, televisions, refrigerators, sump pumps or other such consumer appliances. In one embodiment of the present invention, during dispensation of electrical power from receptacle 40, the engine speed might be automatically adjusted by an inverter, controller 42 or other electrical or mechanical system associated with hybrid propulsion system 20. For example, an "electric power" engine setting might be available on an engine throttle control for interface with an operator. Such speed regulation can in certain circumstances enable more effective voltage and/or current regulation of the electrical power dispensed from receptacle 40. In another embodiment of the present invention, hybrid propulsion system 20 might be configured (e.g., with an interlock device) not to dispense electrical power from receptacle 40 until all driven elements (e.g., wheels) and power apparatus elements (e.g., mowing blades) are stopped, immobilized or otherwise disabled.

As an alternate or supplemental charging system for battery 30, a battery charger 36 is shown in FIG. 1 for selective attachment to battery 30, wherein a plug 38 connected with battery charger 36 can be selectively connected to an ordinary household receptacle. In this manner, battery charger 36 can serve (e.g., as a trickle charger) to facilitate charging of battery 30 when the power equipment is not in use. Although in one embodiment, battery charger 36 can be associated with and supported by the power equipment, battery charger 36 might alternatively comprise a separate or remote device not associated with the power equipment but otherwise configured for selective coupling with battery 30 by an operator.

A controller 42 can be provided to coordinate the specific operation of the hybrid mower in accordance with one exemplary embodiment of the present invention. Controller 42 might comprise an electrical or mechanical device configured to provide operational sequencing for a hybrid propulsion system 20. For example, controller 42 might comprise a microprocessor, microcontroller, relay logic, transistors, diodes, timer modules, integrated circuits, memory chips, and/or other components. A controller 42 can be configured, for example, to selectively engage/disengage clutches 60 and 64 to thereby selectively and effectively couple/uncouple power apparatus elements (e.g., blade 66) and generator 32 from engine shaft 56, respectively. Still further, as previously indicated, controller 42 can be configured to control interface device 34 and the resultant electrical connection between battery 30 and generator 32.

Controller 42 can be further configured to receive input signals respectively from an ignition switch 48, PTO switch 44, and/or a safety switch 46. Ignition switch 48 can be a key switch or other electrical switch or pushbutton that is configured to communicate to controller 42 an operator's instruction that engine 50 be started. PTO switch 44 can be configured, for example, to enable an operator to start or stop movement of power apparatus elements (e.g., rotation of a mower blade 66), such as by instructing controller 42 to close or open an interface clutch (e.g., 60). Similarly, PTO switch 44 might be configured to impede operation of ignition switch 48 if the power apparatus elements, PTO elements, driven elements or other operational elements of the power equipment are not properly engaged/disengaged. With regard to a riding mower, ZTR mower, tractor or other power equipment having a seat (e.g., 123 in FIG. 3 or 223 in FIG. 4), safety switch 46 can be associated with the seat and can be configured to generate a signal whenever the operator is not appropriately seated and/or properly restrained. With regard to a walk-behind mower, safety switch 46 can be coupled to a safety lever (e.g., 17 in FIG. 2) associated with the handle of a walk-behind mower and can be configured to generate a signal whenever an operator removes his or her hand from the safety lever. In any event, when controller 42 receives a signal from safety switch 46, controller 42 can be configured to stop engine 50 and/or to otherwise stop rotation of blade 66 (e.g., by causing the disengagement of clutch 60).

Controller 42 might also be configured to activate contactor 52, wherein contactor 52 can selectively establish the appropriate flow of electrical power from battery 30 and/or generator 32 to other accessories associated with the mower. For example, one such accessory might include one or more headlamps 76 that can be activated by a toggle switch 74 available to an operator, for example. Another such accessory might include an electric motor 68 configured to drive a mowing blade 72. Blade 72, for example, might be configured as an auxiliary mowing blade, but might alternatively be configured as the only mowing blade on the associated mower. To facilitate rotation of blade 72, controller 42 can cause contactor 54 to engage, thereby facilitating the flow of electrical power to electric motor 68. When contactor 54 is disengaged, blade 72 will coast to a stop. However, in one embodiment, when contactor 54 is disengaged, the wires leading to electric motor 68 can be shorted together (or can be connected across a resistor) such that electric motor 68 can be forced to stop (e.g., braked) more rapidly.

Other accessories might include electrical PTO-operated devices such as electric motors, lights, heaters, air conditioners, or even power apparatus elements (e.g., a mowing blade, stump grinder, trenching device, cable-laying ground slitter, etc.). Exemplary uses for such electric motors configured as PTO devices might include operation of an earth-drilling bit, a winch, a spreader, a pump, a compressor, or another such power apparatus element. Such PTO devices might either be integral with the power equipment or might alternatively be configured for selective association with the power equipment.

Another accessory can include an actuator configured to propel one or more driven elements. A driven element can comprise a wheel, track (e.g., as used on some bulldozers), belt (e.g., on some snowmobiles), prop (e.g., on some boats), blade (e.g., on some tillers), or an arm (e.g., on some snow blowers), for example. An actuator can comprise any electromechanical device operatively configured to animate or otherwise enable movement of such a driven element. In one embodiment, an actuator might comprise an electric motor operatively coupled with one or more driven elements. Such operative coupling might include a gearbox, belt, chain, drive tape, or other power transmission device, or perhaps might simply involve a direct mechanical connection between the electric motor and the driven element(s). In another embodiment, an actuator can comprise an electric motor configured to operate a hydraulic or pneumatic pump, wherein pressurized fluid and/or gas from such a pump could provide power to one or more hydraulic and/or pneumatic motors operatively coupled with one or more driven elements of the power equipment.

A mower (e.g., 10 in FIG. 2) might comprise at least one electrical wheel drive motor (e.g., 28) configured as an actuator. This same mower might further comprise at least one wheel (e.g., 12) configured as a driven element. An exemplary mower could include virtually any number of wheels and virtually any number of wheel drive motors, wherein the wheels and wheel drive motors can be operatively coupled in any of a variety of suitable configurations. The wheel drive motor and the operative coupling can also be disposed in any of a variety of positions with respect to a wheel. In one exemplary embodiment, a wheel drive motor, operative coupling, and/or power transmission device can be at least partially disposed within the hub of a wheel.

Figure 2:
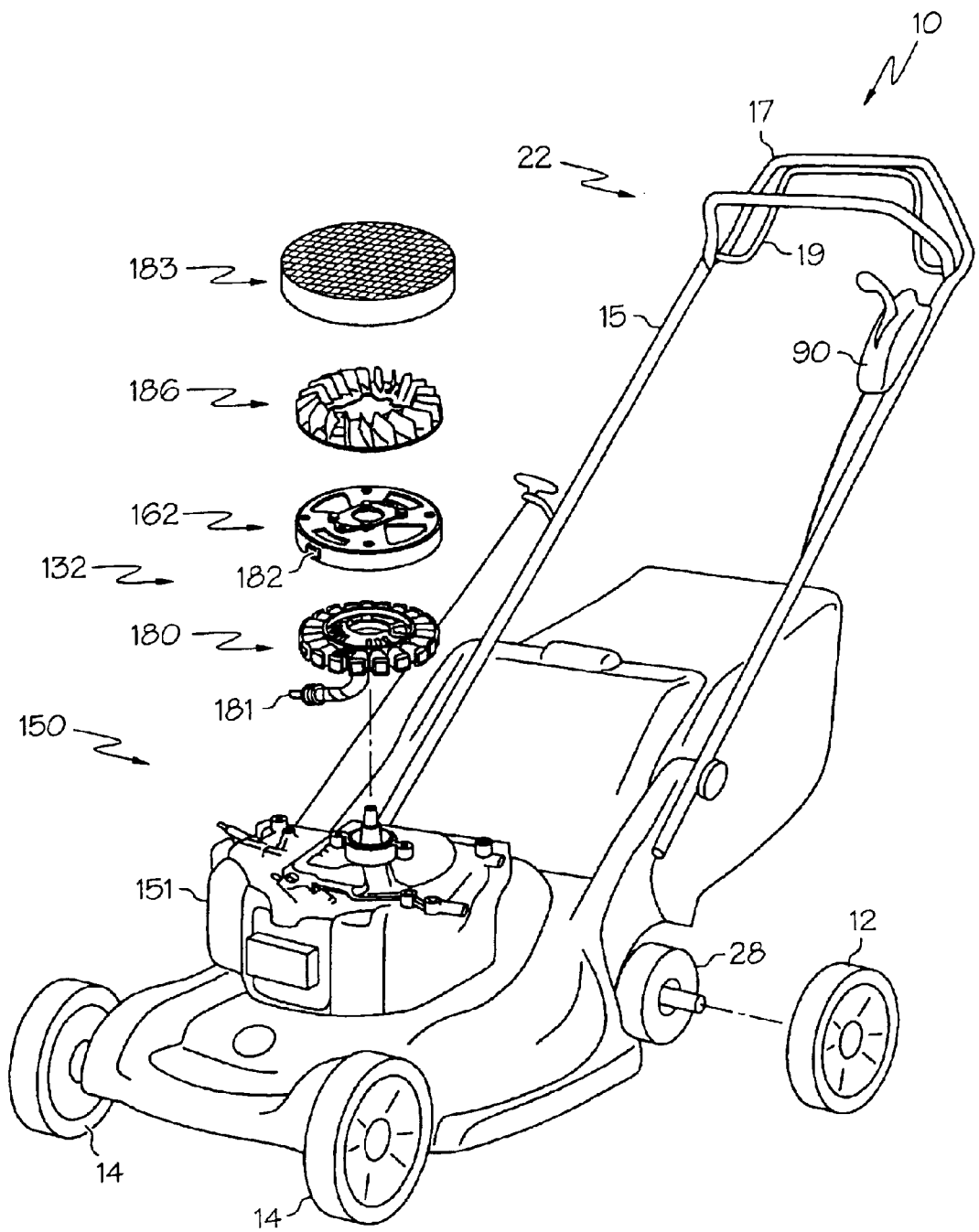
FIG. 2 is a partially exploded front perspective view of a walk-behind hybrid mower in accordance with one exemplary embodiment of the present invention.

In one exemplary embodiment of the present invention, a mower has four wheels but might include only a single wheel drive motor. The single wheel drive motor can, for example, be operatively coupled to only a single rear wheel (e.g., as illustrated in FIG. 2). In an alternate embodiment, an exemplary mower might include four wheels, wherein two of the wheels (e.g., both rear wheels) can be independently driven by two respective wheel drive motors. In still a further embodiment, an exemplary mower might include four wheels, wherein all four wheels can be independently driven by four respective wheel drive motors. In yet another embodiment, two or more wheels (e.g., both rear wheels) can be driven by the same electric motor, such as when a drive shaft and/or other power transmission devices (e.g., a gear box or transmission) are employed to interface a plurality of wheels to a common electric motor.

As will be understood, virtually any power equipment apparatus can comprise a hybrid propulsion system. A hybrid propulsion system can include an internal combustion engine coupled to a generator, wherein the generator can provide electrical power to one or more actuators associated with one or more driven elements. In some embodiments, such driven elements can be configured to propel the power equipment apparatus. While causing mechanical rotation of the generator, the engine might also supply mechanical power to one or more power apparatus elements, accessories, or other mechanical components of the power equipment. For example, with regard to a mower including an exemplary hybrid propulsion system, an engine shaft can be operatively coupled and configured to mechanically transmit power both to a generator and to at least one mowing blade. The electrical power produced by the generator can be selectively coupled to one or more electric motors associated with one or more drive wheels of the mower. In this manner, a mechanical connection to the engine provides power for the mowing blade, but electrical power from the generator provides power for the drive wheels. As previously indicated, power equipment having an exemplary hybrid propulsion system might not involve any mechanical connection to the engine except for the mechanical connection between the engine and the generator. In such a system, all power apparatus elements, driven elements, PTO elements and other accessories would therefore be powered via the generator, such as by electrical, hydraulic and/or pneumatic actuation.

A hybrid propulsion system of the present invention might further comprise an operator interface. An operator interface can assume a wide variety of components and configurations that can provide an operator with an ability to direct the operation of the actuators (e.g., a wheel drive motor) in order that the associated power equipment can be resultantly propelled. For example, an operator interface might include electrical switches, potentiometers, joysticks, pushbuttons, touchpads and/or encoders that are configured to receive instructions from an operator pertaining to the desired direction and/or speed of the associated power equipment. Furthermore, an operator interface might include other operational controls such as choke and throttle levers, start/stop switches and/or pushbuttons, deck-height adjustments, travel speed adjustments, illumination controls, indicator lamps, warning devices or horns, gauges, hour-meters, and/or other control devices.

In one embodiment, as shown in FIG. 2, a walk-behind hybrid mower 10 can include a hybrid propulsion system similar to that depicted in FIG. 1. Mower 10 is depicted as having rear wheels (e.g., 12) and front wheels 14 configured to enable rolling of walk-behind mower 10 along the ground. A handle 15 can be provided to enable control, pushing and manual steering of mower 10 by an operator. Mower 10 is also depicted as including an engine 150, wherein engine 150 is shown to comprise an internal generator 132. In this embodiment, engine 150 might also comprise a shaft (not shown) configured to operatively support and mechanically rotate a mowing blade (not shown). Generator 132 can be configured to provide electrical power to one or more electric motors (e.g., 26, 28) operatively coupled to one or more rear wheels (e.g., 12, 13) of mower 10. In another exemplary embodiment, mower 10 might comprise a separate engine and generator, for example, wherein the engine shaft could be operatively coupled to both a mowing blade and to a shaft (or rotor) of the external generator. Regardless of whether the generator is integral with the engine itself, mower 10 can be configured to employ mechanical power from the engine to rotate the mowing blade while employing electrical power from the generator to achieve propulsion.

An operator interface 22 might also be at least partially associated with handle 15 of mower 10, wherein operator interface 22 can comprise a safety lever 17, a drive lever 19 and an optional speed adjustment control 90. Safety lever 17, for example, can be configured to enable an operator to selectively stop engine 150 and/or cause the mowing blade to stop rotating. Drive lever 19, for example, can be configured to enable an operator to selectively cause the mower to be propelled along the ground. In one embodiment, safety lever 17 and drive lever 19 can be operatively coupled to one or more electrical sensors (e.g., one or more switches or potentiometers), wherein such sensors can be configured to communicate corresponding electrical signals to a motion controller, for example. Speed adjustment control 90, if present, can comprise a knob or lever coupled to a potentiometer or switch, for example, and can be adjusted by an operator to establish the propulsion speed of mower 10.

Figure 3:
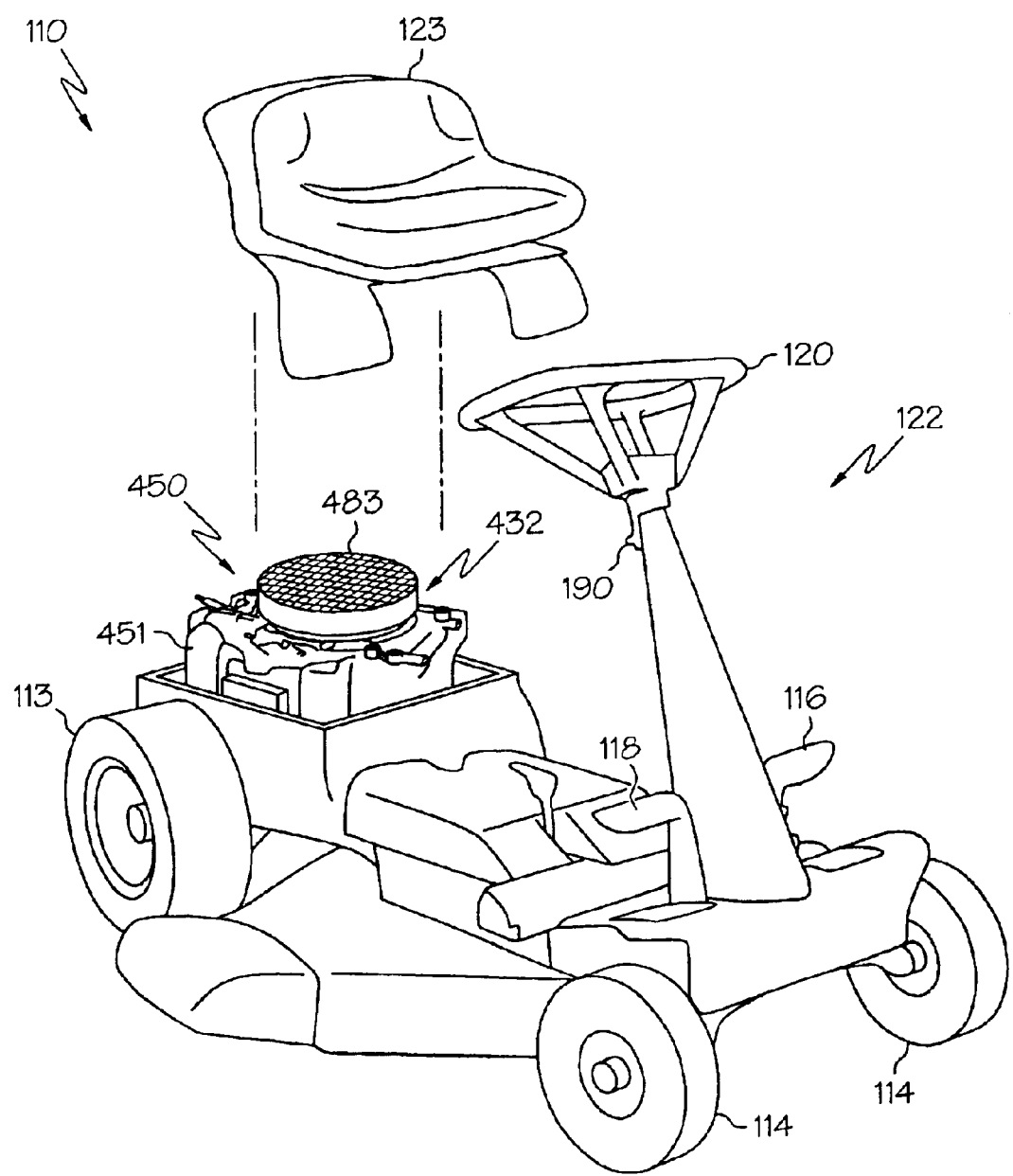
FIG. 3 is a partially exploded front perspective view of a riding hybrid mower in accordance with another exemplary embodiment of the present invention.

In another embodiment, as shown in FIG. 3, a riding hybrid mower 110 might include a hybrid propulsion system similar to that depicted in FIG. 1. Mower 110 can include rear wheels (e.g., 113) and front wheels 114 configured to enable rolling of riding mower 110 along the ground. As depicted in FIG. 3, an engine 450 can be disposed beneath the seat 123 of mower 110, for example. In one embodiment, engine 450 can comprise an engine block 451 and a cover 483, wherein a generator (e.g., 432) might be integrated with engine 450 as previously described with regard to engine 150 of FIG. 2. In still another embodiment, engine 450 might be coupled to an external generator (not shown) with a belt, chain or other operative coupling for example. In either embodiment, electrical power from the generator can be selectively provided to one or more actuators (e.g., an electric motor) operatively coupled to the rear wheels (e.g., 113) of mower 110. The mowing blade(s) associated with mower 110 can be configured in one embodiment to mechanically interface the rotating shaft of engine 450. In another embodiment, any mowing blades associated with mower 110 can be driven by one or more motors, wherein such motors can receive electrical power from the generator, for example.

A seated operator can control movement of riding mower 110 by using an operator interface 122 comprising a steering wheel 120, a left pedal 116 and a right pedal 118. Operator interface 122 might also include a speed adjustment control 190 such as a knob or lever operatively coupled to a potentiometer or switch, for example. Steering wheel 120 can be mechanically coupled to a steering mechanism and/or an electrical sensor (e.g., an encoder or a potentiometer) provided to detect an operator's instructed direction of travel. Also, left and right pedals 116, 118 can be operatively coupled to switches or potentiometers configured to detect pedal displacement. In one embodiment, left and right pedals 116, 118 might be configured to serve as directional indicators. In another embodiment, left pedal 116 might be configured to stop propulsion (e.g., braking of mower 110), while right pedal 118 might be configured to cause propulsion (e.g., acceleration of mower 110).

Figure 4:
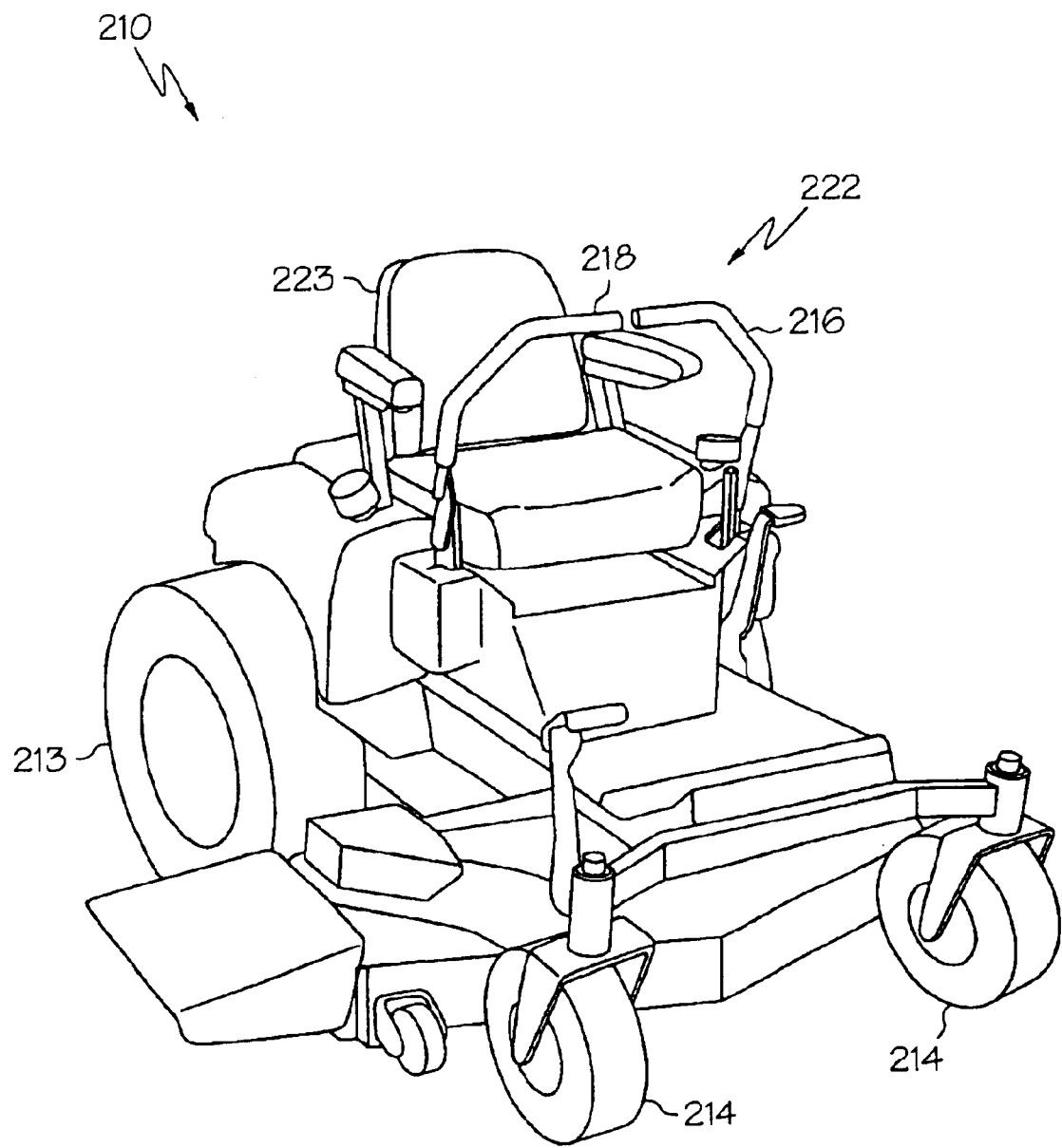
FIG. 4 is a front perspective view depicting a zero-turn radius type hybrid mower in accordance with still another exemplary embodiment of the present invention.

In yet another embodiment, as shown in FIG. 4, an exemplary zero-turn radius (ZTR) hybrid mower 210 is illustrated with a hybrid propulsion system such as that depicted in FIG. 1. Mower 210 can have rear wheels (e.g., 213) and front wheels 214 configured to enable rolling of the ZTR mower 210 along the ground. Mower 210 can include an engine (not shown) having an internal generator, wherein the engine can be located beneath or otherwise adjacent to the operator's seat 223. In an alternate embodiment, the engine might be mechanically coupled to a separate and non-integral generator. In either embodiment, the engine can be configured to provide mechanical energy to rotate one or more mowing blades. Electrical power produced by the generator can be selectively and independently provided (as discussed more fully hereinafter) to actuators (e.g., two motors) associated with the left and right rear wheels (e.g., 213) of mower 210, respectively.

Figure 5:
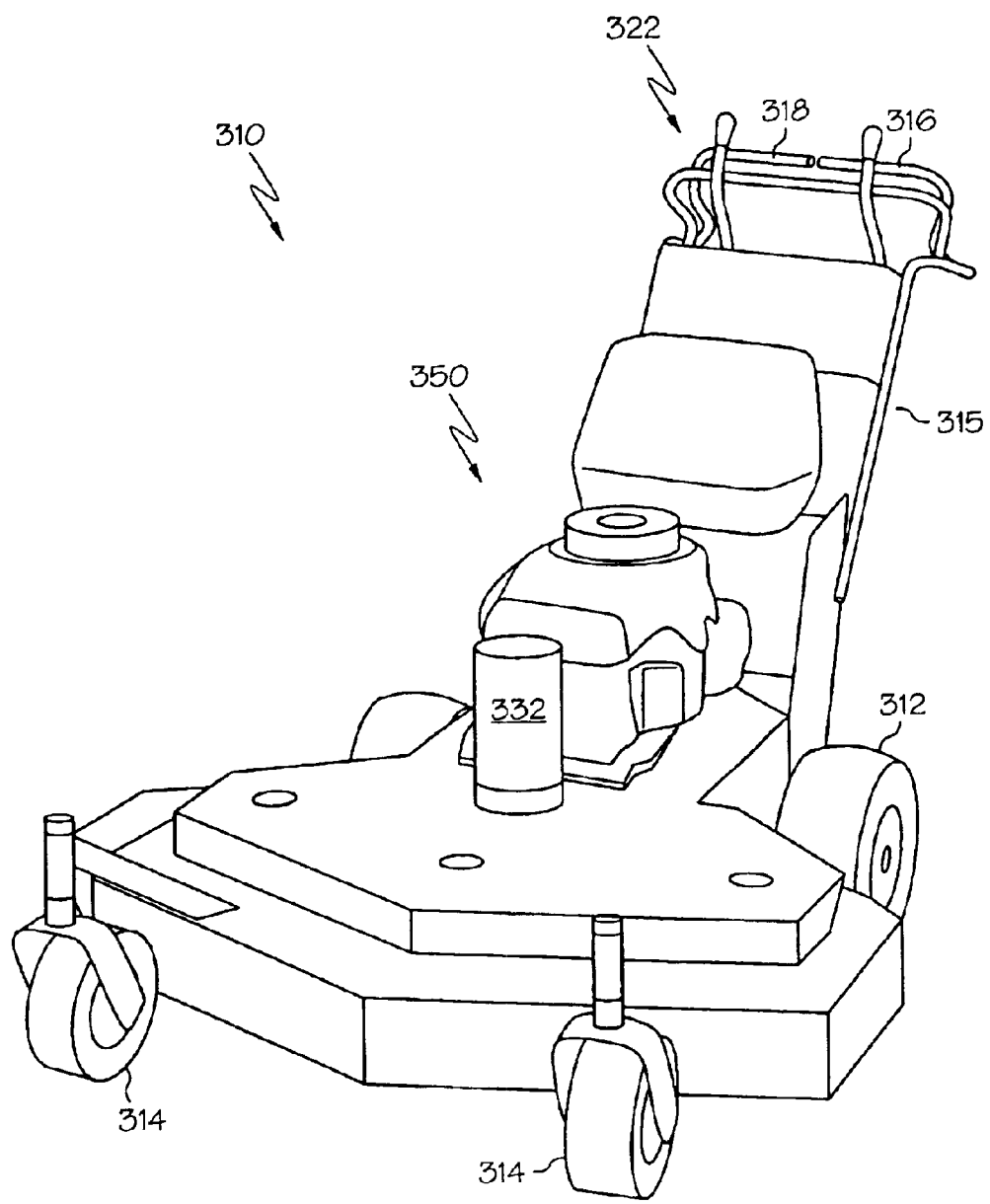
FIG. 5 is a front perspective view of a commercial walk-behind hybrid mower in accordance with yet another exemplary embodiment of the present invention.

Similarly, as shown in FIG. 5, a commercial walk-behind hybrid mower 310 might also comprise a hybrid propulsion system of the present invention. Mower 310 is depicted having rear wheels (e.g., 312) and front wheels 314 configured to enable rolling of walk-behind mower 310 along the ground under the control of an operator at handle 315. Mower 310 can include an engine 350, wherein engine 350 can be mechanically coupled to a separate generator 332 and/or can at least partially integrate a generator. In one embodiment, engine 350 can be configured to provide mechanical energy to rotate separate generator 332 and one or more mowing blades (not shown). While mechanically powered by engine 350, generator 332 can produce electrical power that can be consumed (as further discussed hereinafter) by actuators (e.g., two motors) associated with the left and right rear wheels (e.g., 312) of mower 310, respectively.

Referring to both FIGS. 4–5, movement of mowers 210, 310 can be controlled by a seated operator using an operator interface 222, 322 comprising a left control lever 216, 316 and a right control lever 218, 318, for example. In use, an operator can manipulate left control lever 216, 316 with his or her left arm while simultaneously manipulating right control lever 218, 318 with his or her right arm. Left control lever 216, 316 can be coupled to a first sensing device (e.g., a first potentiometer) that can be configured to generate electrical signals that correspond to the relative displacement of left control lever 216, 316 by an operator. Similarly, right control lever 218, 318 can be coupled to a second sensor (e.g., a second potentiometer) that can be configured to generate electrical signals corresponding to the relative displacement of right control lever 218, 318 by an operator.

In response to signals from an operator interface (e.g., signals from switches, potentiometers, and/or encoders), a motion controller or driver 24 can be configured to selectively provide electrical power to one or more actuators in order that the associated power equipment can be resultantly propelled in accordance with an operator's instructions. For example, again referring to FIG. 1, motion controller 24 can receive electrical power through contactor 52 and can provide electrical power to one or more wheel drive motors on a mower, for example. In a relatively simple embodiment, motion controller 24 might comprise a single contactor configured to selectively connect/disconnect electrical power to a single wheel drive motor (e.g., causing the motor to either be "on" or "off", but with no electrical speed adjustment). In such an embodiment, a multi-speed mechanical transmission might be provided to interface such a wheel drive motor such that a plurality of propulsion speeds can be available for selection by an operator of the mower.

In a slightly more complex embodiment, motion controller 24 might be configured to interface with a multi-speed electric motor. A multi-speed motor (e.g., a two-speed motor or a three-speed motor) comprises an electric motor that can selectively operate at more than one available speed from a substantially fixed electrical power supply. Typically, a multi-speed motor comprises a plurality of electrical terminals, wherein the speed of the multi-speed motor can be determined by which of the electrical terminals receives electrical power. Motion controller 24 can be configured (e.g., with a plurality of contactors) to selectively apply electrical power to the electrical terminals of the multi-speed motor such that the multi-speed motor can propel the associated mower at one of a limited plurality of speeds in accordance with an operator's instructions.

In a more sophisticated embodiment, a motion controller (e.g., 24) might include one or more variable speed motor controllers. Examples of such variable speed motor controllers include direct current variable speed motor controllers (e.g., DC Drives), alternating current variable speed motor controllers (AC Drives), servo controllers, and other types of solid state control devices. Such a variable speed motor controller can provide variable output power (e.g., by varying voltage, current and/or frequency through pulse width modulation) to one or more associated electric motors. By varying the output power to an associated electric motor, the speed of the electric motor can be adjusted predictably by the variable speed motor controller. In fact, by adjusting the power to an associated single-speed motor, a variable speed motor controller can cause the controlled electric motor to operate at practically any speed. Such flexibility in speed control can be especially beneficial with regard to an electric motor operatively coupled to a driven element (e.g., a drive wheel on a mower). For example, greater flexibility in drive wheel speed can facilitate smoother starting and stopping of a mower, more gradual adjustments in speed and direction, and greater flexibility in operating speed, for example.

Due to the relatively low weight of a standard walk-behind mower (as depicted in FIG. 2), an operator typically does not require power-assisted steering of such a mower. Likewise, because some mowers (e.g., riding mower 110 of FIG. 3) can include a steering wheel 120 to facilitate effective manual steering, power-assisted steering may generally not be required on such mowers. Effective propulsion of such power equipment not featuring power-assisted steering might comprise the association of a single actuator with a single driven device. More particularly, with regard to a mower of FIG. 2 or 3, for example, a single electric motor might be operatively coupled to a single drive wheel of the mower. However, if traction is a concern, the single drive motor can be coupled (e.g., with a drive shaft) to a plurality of wheels (e.g., both rear wheels) of the mower. Alternatively, a plurality of electric motors can be coupled to a plurality of wheels, but nevertheless controlled in parallel by a single output of motion controller 24. In one embodiment, traction control systems (as used in some automobiles) might be provided at least partially integral with motion controller 24 in order to facilitate more effective propulsion of the associated power equipment along the ground. In any of these embodiments, one or more single-speed or multi-speed motors might be connected in parallel to a single output of a motion controller, wherein the motion controller, as previously described, can be configured to provide an operator with either single-speed, multi-speed or variable speed control of the associated power equipment.

However, for some power equipment, it might be desirable for a plurality of associated driven elements to be independently controlled by a motion controller. More particularly, by independently controlling both rear wheels of a mower with motion controller 24, a power-assisted steering capability can be provided. Although independent drive wheel control can be implemented on virtually any mower (e.g., such as those depicted in FIGS. 2–5), such functionality might, for practical reasons, only be associated with certain types of mowers (e.g., that are particularly heavy, complex, or require a small turning radius). For example, because a ZTR mower 210 (as depicted in FIG. 4) typically does not involve a manual steering system, effective steering of mower 210 often requires independent rear wheel control. As another example, because a commercial walk-behind mower 310 (as depicted in FIG. 5) can be sufficiently heavy to preclude effective manual steering by an operator, it can often be desirable for such a mower to include power-assisted steering through independent rear wheel control.

With regard to power equipment (e.g., mowers 210, 310) having left and right independently controlled drive wheels, both of the drive wheels can be rotated at the same speed and in the same direction in order to propel the power equipment in a straight direction. However, when moving forward and turning left, the right wheel can move forward at a quicker rate than the left wheel. In fact, in certain instances, the left wheel might actually stop (or even reverse slightly) when making a left turn. Similarly, when making a forward right turn, the left wheel can rotate forward more quickly than the right wheel. In this manner, power equipment having independently driven rear wheels can be caused to turn simply by rotating respective wheels at different speeds.

In order to provide such independent wheel control, mowers 210 and 310 might incorporate wheel drive motors respectively coupled to each of the left and right rear wheels, wherein a motion controller 24 can be configured to independently operate each of those wheel drive motors. For example, motion controller 24 can comprise a set of contactors configured to selectively and respectively enable/disable the rotation of each wheel drive motor thereby enabling each wheel to independently move forward or reverse at a single speed. Although such a system may be effective, a motion controller 24 involving dual multi-speed motors can provide an operator with enhanced control of mower speed and maneuverability, as previously discussed. However, a motion controller 24 including dual variable speed motor controllers can provide an operator with even a more sophisticated level of control, thereby enabling an associated mower to be more effectively maneuvered and controlled by an operator.

Hence, with reference to FIGS. 1, 4 and 5, in an exemplary embodiment of a hybrid propulsion system 20 on a mower (e.g., 210 or 310), a left wheel electric motor 26 might be associated with a left rear wheel and a right wheel electric motor 28 might be associated with a right rear wheel. Both wheel motors 26 and 28 can be operatively coupled to motion controller 24, wherein motion controller 24 can be configured to receive control signals from left drive lever 216, 316 and right drive lever 218, 318 of operator interface 222, 322. In response to control signals from the drive levers, motion controller 24 can employ variable speed motor controllers to selectively and independently control electric motors 26, 28 in accordance with instructions from an operator. In this manner, the mower can be effectively maneuvered by an operator.

The hybrid propulsion system as described herein can be significantly smaller in size and lighter in weight (particularly with regard to larger mowers) than conventional hydraulic and/or mechanical propulsion systems. In addition, in part due to this lighter weight, such hybrid propulsion systems can allow for greater operational efficiency. A hybrid propulsion system can also prove more environmentally friendly than conventional propulsion systems, as the hybrid propulsion system can eliminate the need for hydraulic fluids and/or certain gear or transmission oils that might be environmentally hazardous. By replacing hydraulic and/or engine-driven propulsion systems with electric motors in accordance with the present invention, greater reliability can also be attained, as certain electric motors can be virtually maintenance-free.

Also, such hybrid propulsion systems can enable an operator to more effectively control the travel and maneuverability of an associated mower, particularly when the hybrid propulsion system comprises a motion controller having dual electronic variable speed motor controllers, for variable speed motor controllers can often effectively provide fully adjustable speed control capabilities to an operator. Still further, provided that the associated mower incorporates a battery, the hybrid propulsion system can enable propulsion of the mower even when the engine is not running. In this manner, heavy mowers can be easily and effectively moved within a closed area (e.g., a garage) without generating noxious engine fumes.

Although the foregoing description relates primarily to exemplary illustrations with respect to mowers, it should be understood that the hybrid propulsion system as described herein is equally applicable to many other varieties of power equipment having one or more driven elements. Examples of such power equipment include but are not limited to lawn tractors, snow blowers, snowmobiles, cable-laying machines, trimmers, tillers, ditch diggers, and chippers/shredders. Of course, the specific nature of the hybrid propulsion system will vary depending upon the type of power equipment with which the hybrid propulsion system is associated.

The foregoing description of exemplary embodiments and examples of the invention has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. The scope of the invention is, of course, not limited to the examples or exemplary embodiments set forth herein, but can be employed in any number of applications and equivalent devices by those of ordinary skill in the art. Rather, it is hereby intended that the scope of the invention be defined by the claims appended hereto.

What is claimed is:

1. A walk-behind mower comprising:
    a deck;
    a handle fastened to the deck;
    a plurality of wheels associated with the deck;
    a first electric motor operatively coupled with at least one of said wheels and being configured to rotate said coupled wheel;
    an operator interface attached to the handle for receiving input from an operator;
    an internal combustion engine associated with the deck and having a drive shaft;
    a generator operatively coupled to the engine, the generator being configured to generate electrical power for use in operating the first electric motor; and
    a motion controller configured to receive electrical power from the generator and for selectively directing the electrical power to the first electric motor in response to input at the operator interface.

2. The walk-behind mower of claim 1 wherein the generator is integral with the engine.

3. The walk-behind mower of claim 2 wherein the generator includes a rotor and a coil assembly, the rotor being rotationally movable with respect to the coil assembly, the rotor and coil assembly being at least partially integrated with the engine such that the rotational movement of the rotor provides sufficient inertia in the engine to facilitate ongoing engine operation.

4. The walk-behind mower of claim 1 wherein the generator is separate from the engine.

5. The walk-behind mower of claim 1 further comprising a mowing blade.

6. The walk-behind mower of claim 5 further comprising a clutch, the clutch being operative to interface the drive shaft with the mowing blade, wherein the clutch is configured to selectively disengage the mowing blade from the drive shaft.

7. The walk-behind mower of claim 1 wherein two of said plurality of wheels are operatively coupled to the first electric motor, the first electric motor being configured to rotate said two coupled wheels.

8. The walk-behind mower of claim 1 wherein only one of said plurality of wheels is operatively coupled to the first electric motor, the first electric motor being configured to rotate said one coupled wheel.

9. The walk-behind mower of claim 8 further comprising a second electric motor, the second electric motor being operatively coupled with another of said plurality of wheels and being configured to rotate the another coupled wheel.

10. The walk-behind mower of claim 9 wherein the motion controller is further configured for selectively directing the electrical power to the second electric motor.

11. The walk-behind mower of claim 1 wherein the motion controller comprises a variable speed motor controller.

12. A mower having a hybrid propulsion system, the mower comprising:
    a first drive wheel;
    a second drive wheel;
    a first electric motor operatively coupled with the first drive wheel and being configured to rotate the first drive wheel;
    a second electric motor operatively coupled with the second drive wheel and being configured to rotate the second drive wheel;
    an operator interface being configured to provide an operator with an ability to direct the operation of the first and second electric motors;
    an internal combustion engine;
    a generator operatively coupled to the engine, wherein the generator is at least partially integral with the engine and is configured to generate electrical power for use in operating the first and second electric motors; and
    a motion controller configured to receive electrical power from the generator and for independently operating each of the first and second electric motors in response to signals from the operator interface, wherein the independent operation of the first and second electric motors facilitates steering of the mower.

13. The mower of claim 12 wherein the generator includes a rotor and a coil assembly, the rotor being rotationally movable with respect to the coil assembly, the rotor and coil assembly being at least partially integrated with the engine such that the rotational movement of the rotor provides sufficient inertia in the engine to facilitate ongoing engine operation.

14. The mower of claim 12 wherein the motion controller comprises first and second variable speed motor controllers.

15. The mower of claim 12 wherein the mower is a zero-turn radius mower.

16. The mower of claim 12 wherein the mower is a riding mower.

17. The mower of claim 12 wherein the mower is a walk-behind mower.

18. A power equipment apparatus having a hybrid propulsion system, the power equipment apparatus comprising:
    a driven element;
    an actuator operatively coupled to the driven element;
    an operator interface for receiving input from an operator;
    an internal combustion engine;
    a generator having a rotor and a coil assembly, the rotor being rotationally movable with respect to the coil assembly, the rotor and coil assembly being at least partially integrated with the engine such that the rotational movement of the rotor provides sufficient inertia in the engine to facilitate ongoing engine operation, the generator being configured to generate electrical power for use in operating the actuator; and a motion controller configured to receive electrical power from the generator and for selectively directing this electrical power to the actuator in response to input at the operator interface.

19. The power equipment apparatus of claim 18 wherein the driven element comprises a wheel.

20. The power equipment apparatus of claim 18 wherein the actuator comprises an electric motor.

21. The power equipment apparatus of claim 20 wherein the motion controller comprises a variable speed motor controller.

22. A walk-behind mower comprising:

a handle fastened to a deck and supporting a drive lever;

a plurality of wheels associated with the deck, wherein at least one of said wheels is operatively coupled to a single electric motor configured to rotate said coupled wheel;

an internal combustion engine associated with the deck and having a drive shaft;

a mowing blade mechanically coupled to the drive shaft;

a generator operatively coupled to the engine, wherein the generator is at least partially integral with the engine and is configured to generate electrical power; and, a motion controller configured to receive electrical power from the generator and to selectively facilitate provision of this electrical power to the electric motor in response to engagement by an operator of the drive lever.

* * * * *